W. C. MILES.
OBLIQUE FOLDING MIRROR.
APPLICATION FILED MAR. 28, 1911.
1,005,731.
Patented Oct. 10, 1911.
2 SHEETS—SHEET 1.
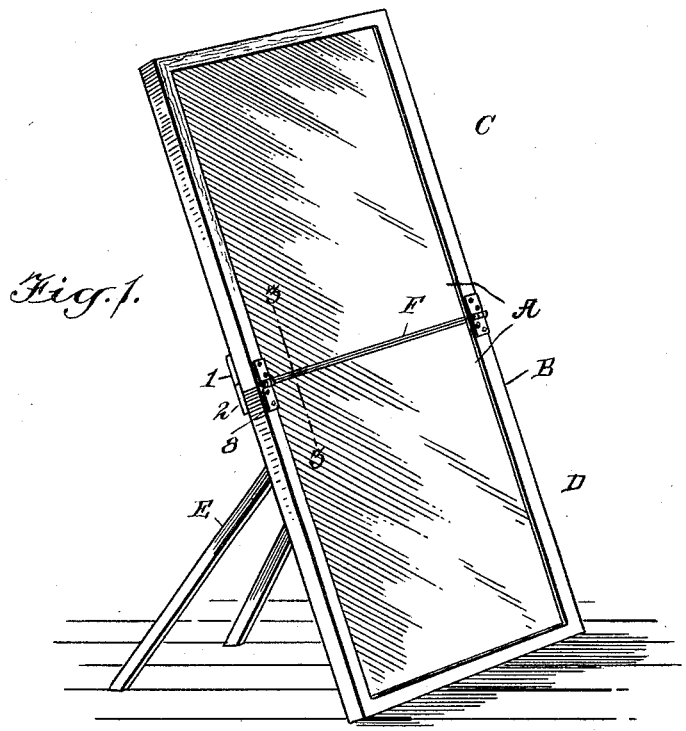
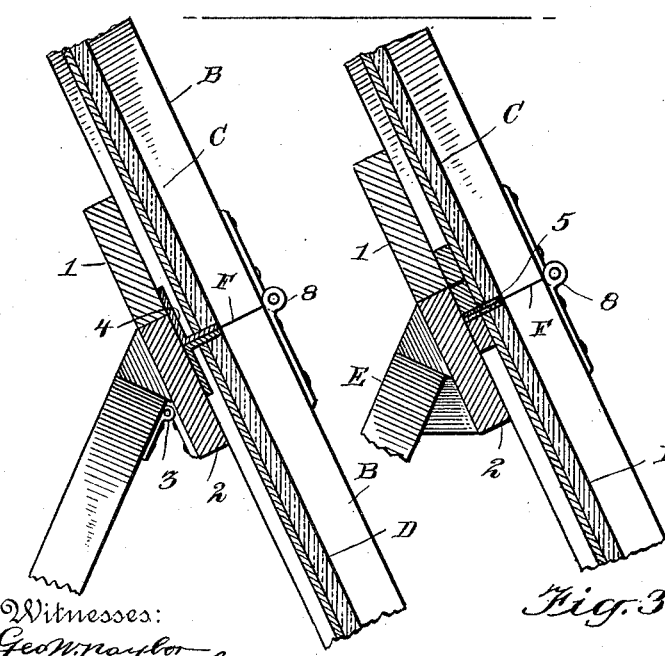
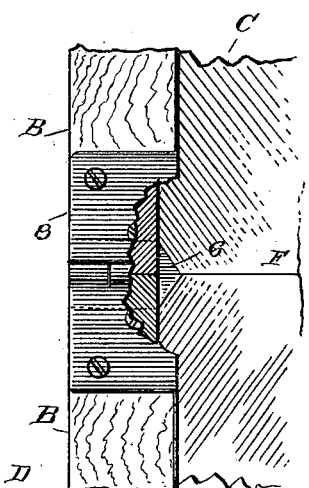

W. C. MILES.
OBLIQUE FOLDING MIRROR.
APPLICATION FILED MAR. 28, 1911.
1,005,731.
Patented Oct. 10, 1911.
2 SHEETS—SHEET 2.
Fig. 5.
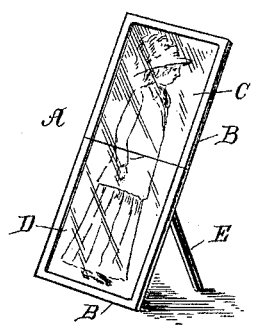
Fig. 6.
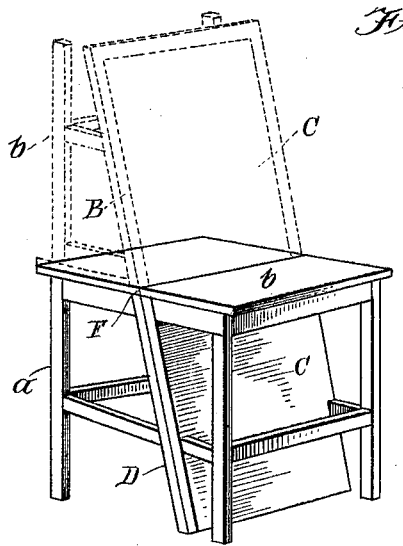
WITNESSES
R. K. Smith.
Willis C. Miles  INVENTOR

UNITED STATES PATENT OFFICE.

WILLIS C. MILES, OF JERSEY CITY, NEW JERSEY.

OBLIQUE FOLDING MIRROR.

1,005,731.   Specification of Letters Patent.   Patented Oct. 10, 1911.

Application filed March 28, 1911. Serial No. 617,480.

*To all whom it may concern:*

Be it known that I, WILLIS C. MILES, a citizen of the United States, residing at Jersey City, in the county of Hudson and State of New Jersey, have invented a new and useful Improvement in Oblique Folding Mirrors; and I hereby declare the following to be a full, clear, and exact description of the invention, such as will enable others skilled in the art to which it appertains to make and use the same.

My invention is fully illustrated in the drawings of which—

Figure 1 is a perspective view in an open position for use. Fig. 2 is a sectional side view showing a metal strip to hold the glass in position with means for support attached at rear adapted to fold. Fig. 3 is a side sectional view through 3—3 in Fig. 1 showing a fibrous or other material to protect the edge of the glass with stationary means for holding the mirror in an oblique position. Fig. 4 is a sectional view of the mirror with a portion of the frame broken away showing brass projections which are employed to hold the sections of the mirror rigid in the frame. Fig. 5 shows the reflection of a full grown person in an improved oblique mirror 36 inches in height. Fig. 6 shows the mirror in a closed position, the dotted lines being used to illustrate the same in an open position for use, the frame construction being such as to form a stool when closed.

The object of the present invention is to produce a mirror of sufficient surface whereby one may see his person from head to foot at a glance, which will fold compactly for transportation and safety; a device not only conveniently arranged for the use of tourists and theatrical troupes, but especially adapted for the dress-making, millinery and clothing trades as well as for family use; giving to the user a mirror surface which, when in position, will answer the purpose of a cheval-glass or upright mirror with about one-half less surface in use on account of the glass being placed in an oblique position; and also on account of the glass extending from the floor upward a full view of one's person will be given at close quarters, as illustrated by Fig. 5 in the drawings.

It is a noted fact that tourists and theatrical people in traveling seldom, if ever, find a mirror in the dressing apartments assigned them, wherein they can view themselves satisfactorily; the mirror connected to the dresser or hung upon the wall, even if of proper size, being invariably in too high a position for one to view the lower part of his person; and hand mirrors are of no use whatever. The upright mirror or cheval-glass at present in use, cannot be moved about with safety as it is ungainly and bulky, and a dangerous article to handle, not only in transportation but when moved from room to room, in that the glass is always open to invite an accident; and the size of the article is objectionable.

Applicant to construct a device of this character, practically takes a mirror 40 inches in length and cuts the same in twain, thus providing two mirror plates of about equal size for the upper and lower member so that when the same are hinged together one above the other, its normal condition is restored. In order to provide the mirror with means whereby it can stand in an oblique position, applicant attaches to the lower member a base, standard or frame which causes the said member to remain in a fixed position so that when the upper half is hinged to the lower member, the device can be opened and closed at will; and as the lower member rests in an oblique position, the upper member will, by the action of the hinges, also assume an oblique position when the device is open for use. By this arrangement one may see his entire person from head to foot in a mirror which in much shorter than himself.

Applicant is aware that various devices consisting of two undivided mirrors hinged together longitudinally or side by side and arranged to fold by the operation of the hinges, have been made and are in use for divers purposes; but in the construction of such devices the mirrors are not employed simultaneously to reflect, neither do the two glasses and frames meet to form one mirror. Generally one of such mirrors of proper size standing upright is alone sufficient to answer the purpose of a mirror; neither is it possible to observe one's person in both mirrors at once; but in order to see himself in the second mirror as he saw himself in the first, a change of position as well as a change of vision is necessary. Furthermore, where photographers have taken two mirrors and hinged them together, each is supported by its own base in a vertical position to the floor to move in a horizontal plane (as illustrated and described to some extent in the patent issued to Ranger #505,127, Sept. 19, 1893); they are not arranged to reflect a reverse image like an ordinary mirror as in the case of the present invention; they are held at right angles or other definite angle and arranged to present a correct reflected image of a person placed opposite the apex. Therefore, the mirrors in this position are not adapted to be employed as an ordinary mirror, neither can the glasses be used simultaneously as one glass; nor are they adapted to be set at an angle of 180 degrees instead of an angle of 90, as the construction of such devices will not permit it, not only on account of the mechanism attached thereto, but also as the two mirrors are set at right angles one mirror is generally employed to hold the other mirror in position and vice versa. The mirrors, separately framed, cannot by the action of the hinges, in closing, reduce the size, and instead of diminishing the bulk as in the present invention, bulk and weight are increased by the use of two mirrors instead of one. On the other hand, however, when the device of applicant is opened the simultaneous use of the upper and lower members is inevitable and necessary to meet the requirements of a cheval-glass; and when said device is closed, it is reduced to one-half its original length. It will be noted that this is made possible only by the upper and lower members being so connected to each other that the upper member may be swung about the lower member on a transverse axis through the meeting point of the upper and lower mirror frames and that said members, when closed, will lie face to face.

It will be noted that in the frequent opening and closing of the device when the unprotected edges of the glass come together, a little carelessness might jar and break the glass especially of the upper member. Also that when the device is closed the edges of the glass, when unprotected, present an unfinished appearance. Therefore, such means must be employed as will not only afford a covering but which will also prevent sudden jar or displacement of the glass within the frame.

In the drawings A represents the mirror consisting of a frame and glass made up of two members or parts, the lower member having a supporting base which holds the mirror section at an oblique angle to the floor; while the upper portion hinged to it, as aforesaid, normally lies in the same plane as the lower mirror section and forms a continuation thereof, so that when the upper member is manipulated the device opens and closes; when closed the upper and lower portions or members rest face to face; and when opened the mirror A will resume its normal condition wherein both glasses reflect simultaneously as one glass. On account of the glass being held at an angle from the floor, as illustrated, about one-half the surface is required in the make up of the mirror thus reducing expense as well as bulk.

B represents the frame of mirror A in two parts, the lower portion inclosing a mirror section on each side and bottom thereof, having a supporting base connected thereto; the upper portion inclosing a mirror section on each side and top thereof; the frame thus constructed when hinged together with the mirror glasses in their respective places form and constitute an entire mirror frame. The same may be in the form shown or otherwise as may be preferred.

D represents the stationary portion or lower member of mirror A, showing the glass held at an oblique angle from the floor by a base connected thereto; while C represents the upper member of said mirror hinged to the upper part of the lower member so that it may be swung about the lower member on a transverse axis through the meeting point of the upper and lower mirror frame, the upper part being held in position at same angle as the lower member whereby both taken together form and constitute the mirror A in an open position.

F represents the place of division and junction as well as the place of hinging, and the same may be as shown or otherwise as may be preferred.

E is the frame, standard or any means employed as a supporting base to the lower member D, and generally connected at the rear of said portion; and the same may be constructed as shown in Figs. 1, 2, and 5 of the drawings, in which, by the operation of a hinge, the same is adapted to fold, or it may be constructed to remain in a fixed position represented by Fig. 3, while in the form shown in Fig. 6, a frame may be constructed in such a manner that when the article is closed the same will assume the form of a stool. *a* represents that portion employed to hold the lower glass in a stationary position, while *b* is the portion in which the upper glass is placed; when the article is in position for use the same may be employed to hold the upper mirror in position, as shown by dotted lines. A weight in any form attached to the lower end of the lower member possibly would be sufficient to hold the same in a fixed position. There are many ways and means known whereby the lower member may be retained in a fixed position; consequently applicant does not limit himself in regard to the details of the construction. Furthermore, it will be noted that the means employed as a base to hold the lower member stationary answers a twofold purpose in that said means not only causes the lower member to become fixed as a base upon which the upper half may rest, but said means also holds the entire mirror at an oblique angle.

The numeral 1 represents a frame sometimes employed across the back of member C, while 2 represents a small board attached to the back of member D; the two acting in conjunction supply the means whereby the upper member may be held rigid. However, they are not absolutely necessary, as the upper member would be held rigid in an oblique position by its own weight. Also the means employed as a base to hold the lower member stationary, may be connected to board 2 in the manner shown or otherwise.

3 is the hinge that may be employed to connect the members in the manner shown or otherwise, as may be preferred.

4 represents a metal strip running across the open end of frame and glass to not only protect the glass but to hold the same rigid, lest while the members are manipulated a sudden jar or rough handling might break the glass.

5 is a fibrous material which may be used in lieu of the metal strip for the purpose of protecting the glass and to give it a finished appearance when closed.

6 are metal ends used to hold the glasses from misplacement. Possibly same may be used in conjunction with the fibrous covering. 8 are the hinges sometimes employed to connect the upper to the lower member.

It will be noted that much depends upon the mirror being held at an oblique angle to the floor whereby the surface of the glass employed is greatly reduced in length; and a full-grown person can observe his entire length in a mirror 36 to 40 inches long, getting the result obtained in a cheval-glass 68 to 70 inches in length. Bulk, weight and cost are in this manner greatly reduced.

Now it is obvious that various changes in the form, proportion and minor details of construction may be resorted to without departing from the spirit or sacrificing any of the advantages of the invention.

Having thus described my invention what I claim and desire to secure by Letters Patent is,—

1. An oblique folding mirror comprising upper and lower members, the lower member consisting of a frame inclosing a mirror section on each side and bottom thereof, and having a supporting base connected thereto adapted to hold the mirror section at an angle to the floor; the upper member consisting of a mirror section inclosed by a frame on each side and top thereof connected to said lower frame at such an angle that the upper mirror section normally lies in the same plane as the lower mirror and forms a continuation thereof; said upper and lower members being so connected to each other that the upper member may be swung about the lower member on the transverse axis through the meeting point of the upper and lower mirror frames so that the two mirror sections taken together form one mirror in which both sections are employed simultaneously; and when closed to lie face to face; a supporting base connected to said lower member whereby the mirror section D is held at an oblique angle to the floor, substantially as and for the purpose set forth.

2. A folding mirror comprising upper and lower members the lower member consisting of a frame inclosing a mirror section on each side and bottom thereof, and having a supporting base connected thereto adapted to hold the mirror section at an angle to the floor, the upper member consisting of a mirror section inclosed by a frame on each side and top thereof connected to said lower frame at such an angle that the upper mirror section normally lies in the same plane as the lower mirror and forms a continuation thereof; said upper and lower members being so connected to each other that the upper member may be swung about the lower member on a transverse axis through the meeting point of the upper and lower mirror frames so that the two mirror sections taken together form one mirror in which both glasses are employed simultaneously; and when closed to lie face to face; a supporting base connected to the rear of said lower member whereby both the mirror section D and mirror A are held at an oblique angle to the floor; means employed at the meeting point of the two glasses to protect the same, substantially as and for the purpose set forth.

3. An oblique folding mirror, comprising upper and lower members, the lower member consisting of a frame inclosing a mirror section on each side and bottom thereof, and having a supporting base connected thereto adapted to hold the mirror section at an angle to the floor; the upper member consisting of a mirror section inclosed by a frame on each side and top thereof, connected to said lower frame at such an angle that the upper mirror section normally lies in the same plane as the lower mirror, and forms a continuation thereof, said upper and lower members being so connected to each other that the upper member may be swung about the lower member on a transverse axis through the meeting point of the upper and lower mirror frames so that the two mirror sections taken together form one mirror in which both sections are employed simultaneously and when in a closed position will lie face to face; a supporting base connected to said lower member whereby the same is held at an angle to the floor; means employed at the meeting point of the two glasses to hold the same rigid within the frame; means connected to said mirror frames to hold upper mirror section in place when in an open position, substantially as and for the purpose specified.

WILLIS C. MILES.

Witnesses:
R. K. SMITH,
GEO. W. NAYLOR.

Copies of this patent may be obtained for five cents each, by addressing the "Commissioner of Patents, Washington, D. C."